UNITED STATES PATENT OFFICE 2,023,278

METHOD OF PURIFYING SAND

Rob R. McGregor, Swissvale, and Edwin W. Tillotson, Pittsburgh, Pa., assignors to Macbeth-Evans Glass Company, Charleroi, Pa., a corporation of Pennsylvania No Drawing. Application September 14, 1934, Serial No. 744,010

5 Claims. (Cl. 209—2)

The invention relates to the purification of sands, whether they are those which occur naturally in uncompacted form or those produced by crushing or pulverizing rocks. While the invention is applicable to various sands, such as zirconia sands used in the manufacture of electrical insulators, it is especially applicable to the treatment of silica sands used in the manufacture of glass, particularly glass in which the presence of various impurities is objectionable.

It is well known that, as quarried glass sand contains variable amounts of accessory minerals as impurities, such, for example, as garnets, rutile, feldspar, mica, staurolite, pyrite, siderite, hematite, clay, etc. These impurities are present largely in particles of about the same grain size as the quartz grains of sand, and while some of them may be removed by simple screening, nevertheless a relatively large proportion of them remains in the sand after screening.

Our invention is predicated upon our discovery that impurities which contaminate sand, and which have a lower softening temperature than that of the sand, may be effectively removed by heating granular sand of substantially uniform grain size to a temperature between its softening temperature and that of its contaminants to form agglomerates containing impurities, and then removing the agglomerates from the sand. We have found that by so treating sand some impurities may be removed which it is difficult if not impossible to remove by other ways of sand purification, and that impurities which may be otherwise removed are also removed by this method.

In thus heating sand contaminated with impurities of the character explained, the impurities soften and form, either independently or on grains of sand, nuclei of agglomerates larger in size than the grains of sand. By the thus softened or fused impurities grains of sand are cemented together to form the agglomerates, and when the agglomerates are removed from the sand a small portion of the sand is also removed. Because of this, and also to effect greater purification of the sand, it is desirable to first remove some of the impurities from the sand, which may be done by one or more of the familiar procedures for this purpose, the particular procedure or procedures used depending upon the amount and nature of the contaminating impurities. For example, after glass sand has been quarried and crushed sufficiently to separate its individual grains of quartz, and in some cases to fracture them, it may be washed to remove much of its content of clay, iron oxide and other minerals such as mica. After drying the sand may be sized by screening it, and may then be passed over a magnetic separator to remove any magnetic iron that may have been introduced by the crushing treatment, and also any magnetic minerals that may otherwise be present. In some cases, particularly when treating sand containing relatively large amounts of iron, the sand may be exposed to the action of an acid solution, for example, 50 per cent hydrochloric acid, or to halogen gases at an elevated temperature.

In the practice of our invention, granular sand which has previously been partially purified by one or more of the procedures just explained, or in any other suitable way, is screened to remove its content of particles larger than a desired size. Depending upon the known or desired grain size of the sand, it may be screened by a 20 to a 100 mesh screen. The screened sand containing impurities is then heated to a temperature between that of the softening temperature of the principal impurities which it is desired to remove and the softening temperature of the sand. The heating may be done in any well-known or desired way, such as in a crucible or by passing the sand through a rotary furnace or kiln. In the case of glass sand from which it is desired to remove chiefly iron, the heating temperature is preferably between about 1000° and 1600° C. When heated to a temperature of 1500° C., we have found that by maintaining the sand at that temperature for about three hours a substantial amount of impurities can be removed by subsequently separating the agglomerates which are formed by fusion in the manner previously explained.

For removing the agglomerates, the sand is preferably again passed through a screen which should be somewhat larger in mesh than that used for screening the sand prior to heating it. A larger mesh screen is used for the final screening because the heating of quartz sand partially transforms it to another form of silica, namely tridymite, which are about 10 per cent larger than in their quartz form. This transformation of the form of the silica to tridymite renders it more reactive chemically than is quartz, so that it can be dissolved more readily by fluxes and requires less heat to bring it to a molten state, which are advantages in various subsequent uses of the sand, as for example in the manufacture of sodium silicate and in making glass. The agglomerates, which are a new product, may be used for various desired purposes.

As an example of the practice of our invention, glass sand after being subjected to preliminary purifying treatments, including washing with acid, was found to contain 0.018 per cent of iron in the form of oxides. After heating this sand in a crucible to about 1500° C. for three hours, there was removed as agglomerates or coarse lumps 3.2 per cent of its original weight, and it was found that 21.3 per cent of the total iron present had been removed from the finer fraction.

When it is desired to still further remove impurities from sand treated according to our invention, it may be passed through a high intensity magnetic separator to remove the minute traces of iron or other magnetic materials that may occur by reason of the previous treatments or otherwise, and may also be treated with a hot aqueous acid solution and then washed with water and dried.

According to the provisions of the patent statutes, we have explained the principle and mode of operation of our invention, and have given specific examples of how it may be practiced. However, we desire to have it understood that, within the scope of the appended claims, the invention may be practiced otherwise than as specifically described.

We claim:

1. The method of purifying granular sand containing impurities having a lower softening temperature than that of the sand, comprising heating the thus-contaminated sand to a temperature of from about 1000° to 1600° C. for a time sufficient to form agglomerates containing impurities, and removing the agglomerates from the sand.

2. The method of purifying granular glass sand containing impurities having a lower softening temperature than that of silica, comprising heating the thus-contaminated sand to a temperature of from about 1000° to 1600° C. for a time sufficient to form agglomerates containing impurities, and removing the agglomerates from the sand.

3. The method of purifying granular glass sand containing impurities having a lower softening temperature than that of silica, comprising heating the thus-contaminated sand to a temperature of about 1500° C. for a time sufficient to form agglomerates containing impurities, and removing the agglomerates from the sand.

4. The method of purifying granular sand containing impurities having a lower softening temperature than that of the sand, comprising screening the thus-contaminated sand, heating it to a temperature of from about 1000° to 1600° C. for a time sufficient to form agglomerates containing impurities, and screening the sand through a larger mesh screen than used in said first-mentioned screening to remove the agglomerates from the sand.

5. The method of purifying granular glass sand containing impurities having a lower softening temperature than that of silica, comprising screening the thus-contaminated sand, heating it to a temperature of about 1500° C. for a time sufficient to soften impurities and cause them to cement particles of sand into agglomerates, and screening the sand through a larger mesh screen than used in said first-mentioned screening to remove the agglomerates from the sand.

ROB R. McGREGOR.
EDWIN W. TILLOTSON.